United States Patent
Oates

(10) Patent No.: US 9,718,618 B2
(45) Date of Patent: Aug. 1, 2017

(54) SYSTEM AND METHOD FOR TREATING HYDROGEN TO BE STORED IN A SALT CAVERN AND SUPPLYING THEREFROM

(71) Applicant: Rommel M. Oates, Spring, TX (US)

(72) Inventor: Rommel M. Oates, Spring, TX (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 46 days.

(21) Appl. No.: 14/475,120

(22) Filed: Sep. 2, 2014

(65) Prior Publication Data
US 2016/0060038 A1    Mar. 3, 2016

(51) Int. Cl.
| | |
|---|---|
| *B65G 5/00* | (2006.01) |
| *F17C 3/00* | (2006.01) |
| *B01D 53/26* | (2006.01) |
| *C01B 3/00* | (2006.01) |
| *C01B 3/50* | (2006.01) |

(52) U.S. Cl.
CPC .............. *B65G 5/00* (2013.01); *B01D 53/265* (2013.01); *C01B 3/00* (2013.01); *C01B 3/506* (2013.01); *F17C 3/005* (2013.01); *C01B 2203/043* (2013.01); *C01B 2203/0465* (2013.01); *C01B 2203/0475* (2013.01); *C01B 2203/0495* (2013.01); *Y02E 60/321* (2013.01);
(Continued)

(58) Field of Classification Search
CPC .......... B01D 53/265; B65G 5/00; C01B 3/00; C01B 3/506; F17C 3/005
See application file for complete search history.

(56) References Cited

U.S. PATENT DOCUMENTS

| | | | |
|---|---|---|---|
| 2,878,165 | A | 3/1959 | Cottle |
| 3,438,203 | A | 4/1969 | Lamb et al. |

(Continued)

FOREIGN PATENT DOCUMENTS

| | | |
|---|---|---|
| JP | 58 191399 A | 11/1983 |
| WO | WO 02/097321 A1 | 12/2002 |

OTHER PUBLICATIONS

"Hydrogen Reliability Salt Cavern Case Study" Oil Sands Heavy Oil Technologies Conference and Exhibition—Jul. 14-16, 2009, Alberta Canada, available at <http://www.slideshare.net/chojsm1/hydrogen-reliability-cavern-storage>; Published Jul. 20, 2009 ("Slides").

(Continued)

*Primary Examiner* — John Kreck
*Assistant Examiner* — Carib Oquendo
(74) *Attorney, Agent, or Firm* — Nilay S. Dalal

(57) ABSTRACT

A novel system and method for storing hydrogen in a salt cavern and supplying therefrom is provided. Hydrogen product withdrawn from a hydrogen pipeline may be chilled prior to being introduced into a cavern in order to cool at least a portion of the walls of the salt cavern so that one or more layers of the localized portion of the walls attains a stabilized state whereby contaminant release from the walls is suppressed. The present invention anticipates and strategically plans for contaminant intrusion form a salt cavern in order to reduce the degree of contaminant intrusion from a salt cavern while also allowing the stored hydrogen to have more absorption capacity for water vapor by virtue of entering the salt cavern in a sufficiently drier state. Alternatively, or in addition thereto, a crude hydrogen stream may be withdrawn from the cavern and chilled prior to introducing to the hydrogen pipeline.

23 Claims, 3 Drawing Sheets

(52) U.S. Cl.
CPC ........... *Y02E 60/322* (2013.01); *Y02E 60/324* (2013.01); *Y02P 30/30* (2015.11)

(56) References Cited

U.S. PATENT DOCUMENTS

| | | |
|---|---|---|
| 3,807,181 A | 4/1974 | Kuhne |
| 4,025,321 A | 5/1977 | Anderson et al. |
| 4,183,369 A | 1/1980 | Thomas |
| 4,353,214 A | 10/1982 | Gardner |
| 4,365,978 A | 12/1982 | Scott |
| 4,444,727 A | 4/1984 | Yanagihara et al. |
| 4,577,999 A | 3/1986 | Lindorfer et al. |
| 4,592,677 A | 6/1986 | Washer |
| 4,626,131 A | 12/1986 | Glew et al. |
| 4,725,381 A | 2/1988 | Pinto |
| 4,830,056 A | 5/1989 | Chamberlain |
| 5,511,905 A | 4/1996 | Bishop et al. |
| 5,526,280 A | 6/1996 | Consadori et al. |
| 5,669,734 A | 9/1997 | Becnel, Jr. et al. |
| 5,842,519 A | 12/1998 | Sydansk |
| 6,080,306 A | 6/2000 | Falkner |
| 6,503,299 B2 | 1/2003 | Baksh et al. |
| 6,511,528 B1 | 1/2003 | Lansbarkis et al. |
| 6,576,138 B2 | 6/2003 | Sateria et al. |
| 6,581,618 B2 | 6/2003 | Hill et al. |
| 6,880,348 B2 | 4/2005 | Bishop et al. |
| 7,078,011 B2 | 7/2006 | Morrow et al. |
| 7,152,675 B2 | 12/2006 | Heard |
| 7,438,079 B2 | 10/2008 | Cohen et al. |
| 8,425,149 B2 | 4/2013 | Drnevich |
| 8,690,476 B2 | 4/2014 | Oates |
| 8,757,926 B2 | 6/2014 | Drnevich |
| 8,950,419 B2 | 2/2015 | Oates et al. |
| 2004/0123738 A1 | 7/2004 | Spencer |
| 2005/0220704 A1 | 10/2005 | Morrow et al. |
| 2006/0216811 A1 | 9/2006 | Cunningham et al. |
| 2009/0010714 A1 | 1/2009 | Bishop |
| 2009/0184517 A1 | 7/2009 | Mukai |
| 2010/0101789 A1 | 4/2010 | Dickinson et al. |
| 2010/0163804 A1 | 7/2010 | Schenck |
| 2010/0200229 A1 | 8/2010 | Jefferd |
| 2011/0305515 A1 | 12/2011 | Drnevich |
| 2013/0213479 A1 | 8/2013 | Oates et al. |
| 2013/0315669 A1 | 11/2013 | Oates |
| 2014/0161533 A1 | 6/2014 | Oates |
| 2014/0241802 A1 | 8/2014 | Drnevich |
| 2015/0101672 A1 | 4/2015 | Oates et al. |

OTHER PUBLICATIONS

Praxair Extending Hydrogen Pipeline in Southeast Texas—Oil & Gas Journal, vol. 90(34) (1992) (Praxair pipeline).
2006 International Pipeline Conference materials.
16 Tex. Admin. Code§ 3.97 (2007); *Id.* (1994).
Praxair Hydrogen salt cavern schematic from Praxair, Inc. Mechanical Integrity Test, Hydrogen Storage Cavern #1, Sabine Storage 7 Operations, Inc. Project 11-640, Jan. 10, 2012, p. 56 (Cavern Structure).
Praxair Hydrogen Storage Project, TRRC Hearing, Jun. 10, 2004 ("Permit Presentation").
Oil and Gas Docket No. 03-0238823, Examiner's Report and Proposal for Decision, Jul. 28, 2004 ("Permit Review").
Moss Bluff Storage Cavern, Operations and Maintenance Manual, Sep. 16, 2003 ("OPS Manual").
H2 Salt Dome Storage System PFD, Sep. 9, 2003 ("PFD").
Praxair, Inc. Mechanical Integrity Test, Hydrogen Storage Cavern#1, Sabine Storage 7 Operations, Inc. Project 11-640, Jan. 10, 2012 ("5YR MIT").
Stolten, Detlef, ed. Hydrogen and fuel cells: fundamentals, technologies and applications. John Wiley & Sons, 2010 ("Stolten").
Prudential Equity Group Conference, Speaker: Stephen F. Angel, Executive Vice President, Sep. 22, 2005, <http://www.praxair.com/investor-relations/reports-filings-and- presentations/investor-presentations>.
Praxair Commercializes Industry's Only Hydrogen Storage, Oct. 22, 2007 <http://www.praxair.com/news/2007/praxair-commercializes- industrys-only-hydrogen-storage>.
Investment in Gulf Coast to expand facilities and services, Oct. 25, 2007 <http://www.gasworld.com/investment-in-gulf-coast-to-expand- facilities-and-services/2146.article>.
Technology Tutorial by Dr. Joe L. Ratigan ("Technology Tutorial") No date available.
D.J. Evans. 2007. An appraisal of Underground Gas Storage technologies and incidents, for the development of risk assessment methodology. British Geological Survey Open Report, OR/07/023. 287 pp. ("BGS").
Nieland JD. (2008). Salt cavern Thermodynamics-Comparison Between Hydrogen, Natural Gas and Air Storage. SMRI Fall Meeting, Austin, Texas, 215-234.
Tek, M. R. (1996). Natural gas underground storage: inventory and deliverability. PennWell Publishing. ISBN: 0878146148; ISBN-13:9780878146147 ("Tek").
CGA G-5.3:1997 Commodity Specification for Hydrogen, Fourth Edition, by Compressed Gas Association, Inc. ("CGA Spec").
Handbook of Compressed Gases (Van Nostrand Reinhold Company)—Hardcover (1990), by Compressed Gas Association, Compressed Gas Association Staff, 3rd ed., ISBN: 0442218818,ISBN-13: 9780442218812 ("CGA Handbook").
"Marks' Standard Handbook for Mechanical Engineers," 9th Edition (1987) (pp. 7-18-7-19); Publisher: The McGraw-Hill Companies; ISBN: 007004127X; ISBN-13: 9780070041271.
"Performance of Palladium Diffusers for Reliable Purification"; (2002) Extended abstract of a paper presented at CS-MAX, San Jose, CA, Nov. 11-13 (pp. 141-143). ("Funke").
Kelley, J.H., and R. Hagler, Storage, transmission and distribution of Hydrogen, Int. J. Hydrogen Energ., 5, 35-54, 1980 ("Kelly").
IPR No. 2015-01074, filed Apr. 18, 2015.
IPR No. 2015-01075, filed Apr. 18, 2015.
IPR No. 2015-01071, filed Apr. 18, 2015.
IPR No. 2015-01072, filed Apr. 18, 2015.
IPR No. 2015-01073, filed Apr. 18, 2015.
ASTM E534-91. "Standard Test Methods for Chemical Analysis of Sodium Chloride". (Published Oct. 1991) 122 pgs.
Bear, Jacob. "Dynamics of Fluids in Porous Media". American Elsevier Publishing Co., Inc. New York. (No date available). p. 136.
Bérest, P. et al. "Salt Permeability Testing—2001-8-SMRI-Part 1—The Influence of Permeability and Stress on Spherical Hollow Salt Samples". Solution Mining Research Inst. Research Project Report No. 20901-8-SMRI (Oct. 2001). 15 pgs.
Bérest, P. et al. "Salt Permeability Testing—2001-8-SMRI-Part 2—The Influence of Permeability and Stress on Spherical Hollow Salt Samples". Solution Mining Research Inst. Research Project Report No. 20901-8-SMRI (Oct. 2001). 11 pgs.
Brodsky, Nancy S. "Crack Closure and Healing Studies in WIPP Salt Using Compressional Wave Velocity and Attenuation Measurements: Test Methods and Results". Sandia National Laboratories, Contract No. 23-8484. SAND90-7076, (Printed Nov. 1990), 40 pgs.
Brouard et al. "Onset of Tensile Effective Stresses in Gas Storage Caverns". Solution Mining Research Institute, Fall 20907 Technical Meeting, Halifax, Canada (Oct. 8-10, 2007) 18 pgs.
Carter, et al. "Creep of Rocksalt". Elsevier Scientific Publishing Co., Amsterdam. Tectonophysics, 92 (1983) pp. 275-333.
Costin et al. "Creep Healing of Fractures in Rock Salt". Issued by Sandia National Laboratories, SAND80-0392, Published by National Technical Information Service, US Dept. of Commerce. (Sep. 29, 1980) 33 pgs.
CSA Standard Z341.1-06 "Reservoir Storage". Canadian Standards Assoc., (Dec. 2006) 44 pgs.
CSA Standard Z341.2-06 "Salt Cavern Storage". Canadian Standards Assoc., (Dec. 2006) 59 pgs.
CSA Standard Z341.Series 06 "Storage of Hydrocarbons in Underground Formations". Canadian Standards Assoc., (Dec. 2006) 17 pgs.
Durup, Jean Gérard. "Long-Term Tests for Tightness Evaluations with Brine and Gas in Salt (Field Test No. 2 with Gas)". Research

(56) References Cited

OTHER PUBLICATIONS

Project Report No. 94-0002-S. SMRI Research and Development Project Report. Presented at 1994 Fall Meeting, Hannover, Germany, 36 pgs.
ERC Guide. "Natural Gas Storage in Salt Caverns—A Guide for State Regulators". Prepared by Energy Resources Committee of the Interstate Oil and Gas Compact Commission (Reprinted Feb. 1998). 68 pgs.
Fuenkajorn et al. "Dilation-Induced Permability Increase Around Caverns in Salt". Rock Mechanics, Nelson & Laubach (eds) © 1994 Balkema, Rotterdam, ISBN 90 54 10 380 8, 8 pgs.
Hansen et al. "Elasticity and Strength of Ten Natural Rock Salts". First Conf. on Mechanical Behaviour of Salt. Pennsylvania State Univ. (Nov. 9-11, 1981).
Jacoby et al. "Salt Domes As a Source of Geothermal Energy". Mining Engineering (May 1974) pp. 34-39.
Johnson et al. "Salt Deposits in the United States and Regional Geologic Characteristics Important for Storage of Radioactive Waste". Y/OWI/SUB-7414/1 DE 85 013319, Prepared for the Office of Waste Isolation, Union Carbide Corp., Nuclear Div., US Dept. of Energy (Mar. 1978). 191 pgs.
Mullaly, M A C. "Underground Storage in Thin Salt Layers on Teesside" Solution Mining Research Institute Meeting Paper presented in Manchester, UK (Oct. 1982) 10 pgs.
Pfeifle et al. "Correlation of Chemical Mineralogic, and Physical Characteristics of Gulf Coast Dome Salt to Deformation and Strength Properties". Solution Mining Research Inst., Research Project Report #94-0004-S (Jan. 1995) 116 pgs.
Popp et al. "Evolution of Dilatancy and Permeability in Rock Salt During Hydrostatic Compaction and Triaxial Deformation". Journal of Geophysical Research, vol. 106, No. B3 (Mar. 10, 2001) pp. 4061-4078.
Ratigan et al. "LPG Storage at Mont Belvieu, Texas: A Case History". SPE Advanced Technology Series, Reprinted from vol. 1, No. 1 (1993) pp. 204-209.
Ratigan et al. "Rock Mechanics Aspects of Natural Gas Storage in Domal Salt". Solution Mining Research Inst. Meeting Paper. Prepared for SMRI 1993 Fall Meeting, Lafayette, Louisiana (Oct. 25-26, 1993), 50 pgs.
Ratigan, Joe L. "Hydrogen Storage in Solution-Mined Caverns in Salt Domes". Presentation by Ratigan Engineering & Consulting LLC (No date available) 36 pgs.
Stormont et al. "Laboratory Study of Gas Permeability Changes in Rock Salt During Deformation". Int. J. Rock Mech. Sci. & Geomech. Abstract, vol. 29, No. 4 (1992) pp. 325-342.
Sutherland et al. "Argon Gas Permeability of New Mexico Rock Salt Under Hydrostatic Compression". Int. J. Rock Mech. Sci. & Geomech. Abstracts, vol. 17, Pergamon Press Ltd. (1980), pp. 281-288.
Thoms et al. "Survey of Existing Caverns in U.S. Salt Domes". Solution Mining Research Institute Research Project No. 84-0002 (No date available) 47 pgs.
Adams, J., TransGas Limited "Natural Gas Salt Cavern Storage Operating Pressure Determination". Petroleum Society of CIM, Paper No. 97-180. Presented at Seventh Petroleum Conf. of S. Saskatchewan Section, the Petroleum Society of CIM (Oct. 19-22, 1997) 14 pages.

USPTO Case IPR2015-01071, Patent Trial and Appeal Board Decision, Institution of Inter Partes Review, U.S. Pat. No. 7,078,011 B2.
USPTO Case IPR2015-01072, Patent Trial and Appeal Board Decision, Institution of Inter Partes Review, U.S. Pat. No. 7,078,011 B2.
USPTO Case IPR2015-01073, Patent Trial and Appeal Board Decision, Institution of Inter Partes Review, U.S. Pat. No. 7,078,011 B2.
USPTO Case IPR2015-01074, Patent Trial and Appeal Board Decision, Denying Institution of Inter Partes Review, U.S. Pat. No. 8,690,476 B2.
USPTO Case IPR2015-01075, Patent Trial and Appeal Board Decision, Denying Institution of Inter Partes Review, U.S. Pat. No. 8,690,476 B2.
Valenti, Richard M., Compressed Air Energy Storage (CAES) Act, KCC Rule Development, Kansas Corporation Commission, KCC Open Meeting, Issue 3—Final (Jun. 16, 2010) 49 pages.
Parks, G.D., 2007, ChevronPhillips Hydrogen Cavern Clemens Terminal, www.internationalpipelineconference.com/presentation_Files/1030_PARKS-Clemens_Release-Final.ppt.zip ConocoPhilips. As of Jun. 2007.
Breele, Y. et al. "Technico-Economic Study of Distributing Hydrogen for Automotive Vehicles"; International Journal of Hydrogen Energy, Elsevier Science Publishers B.V., Barking, GB, vol. 4, No. 4, Jan. 1, 1979, pp. 297-314, XP025578996, ISSN: 0360-3199, DOI: DOI:10.1016/0360-3199(79)90005-3 (retrieved on Jan. 1, 1979) p. 297-p. 299; Figure 2.
Foh, Stephen et al., "Underground Hydrogen Storage—Final Report". Inst. of Gas Tech., DOE, Brookhaven Natl Lab, Upton, NY (Dec. 1979).
Foh, Stephen et al., "Underground Hydrogen Storage—Final Report". Inst. of Gas Tech., DOE, Brookhaven Natl Lab, Upton, NY (Dec. 1979) Extracted pp. Title, iii, 60, 61, 77, 80 & 81.
Lord, Anna S. et al., "A Life Cycle Cost Analysis Framework for Geologic Storage of Hydrogen: A User's Tool", Sandia Report (SAND2011-6221) Sandia National Laboratories (Sep. 2011), 60 pges.
Mahoney, J.J. and Strachan, D.M. "Reduction of Sulfate by Hyrogen in Natural Systems: A Literature Review", Pacific Northwest Laboratory, Richland, VA (Jan. 1987, Rev. Jan. 1988).
Pottier, J.D. et al. "Mass Storage of Hydrogen"; NATO ASI Series. Series E, Applied Sciences; Hydrogen Energy System: Production and Utilization of Hydrogen and Future Aspects; (Proceedings of the NATO Advanced Study Institute on Hydrogen Energy System, Utilization of Hydrogen and Future Aspects), vol. 295, Jan. 1, 1995, pp. 167-179, XP008139790, ISSN: 0168-132X, pp. 167-pp. 170; Figures 1-3, 8.
Rezunenko et al. "Constructive and Operation of Rock-Salt Underground Helium Concentrate Storage", SMRI Fall Meeting (Oct. 3-6, 1999).
Thoms, R. L. and Gehle, R.M. "A Brief History of Salt Cavern Use", Keynote Speech at Salt 2000 Conference (2000) no month.
Venter, R.D. et al; "Modelling of Stationary Bulk Hydrogen Storage Systems"; International Journal of Hydrogen Energy, Elsevier Sci8ence Publishers B.V., Barking, GB, vol. 22, No. 8, Aug. 1, 1997, pp. 791-798, XP004075354, ISSN: 0360-3199, DOI: DOI:10.1016/S0360-3199(96)00210-8, p. 791-pp. 793; Tables 1, 2.

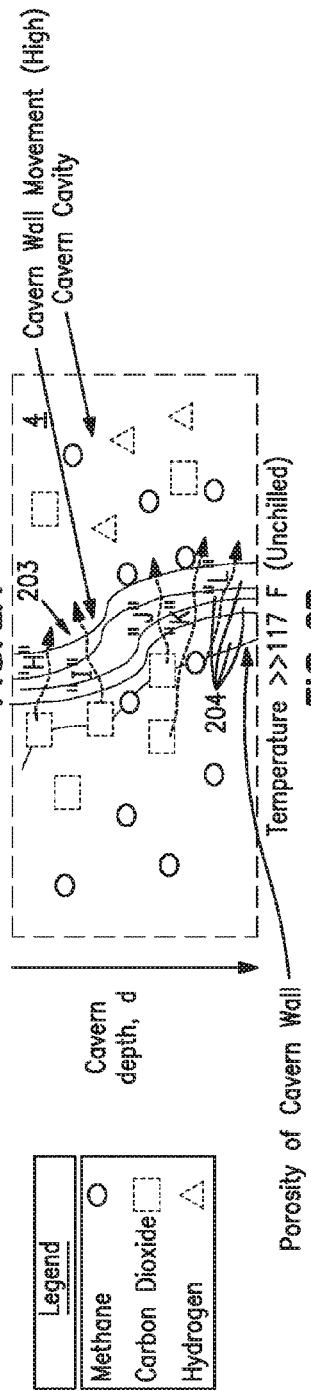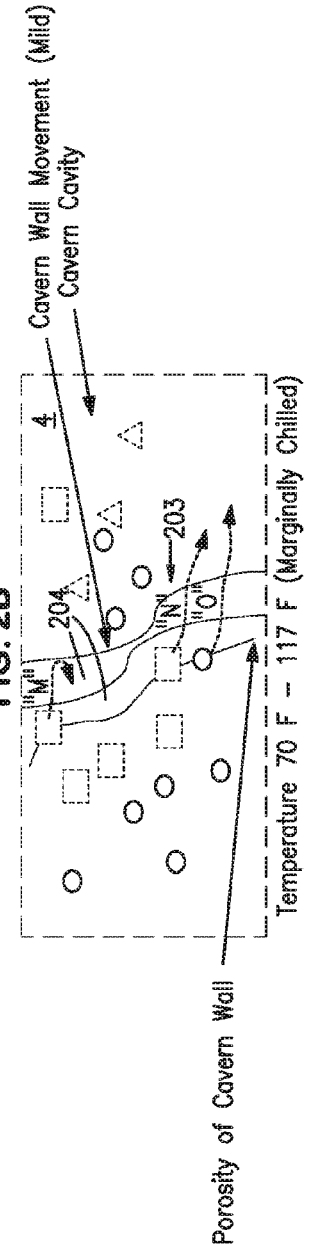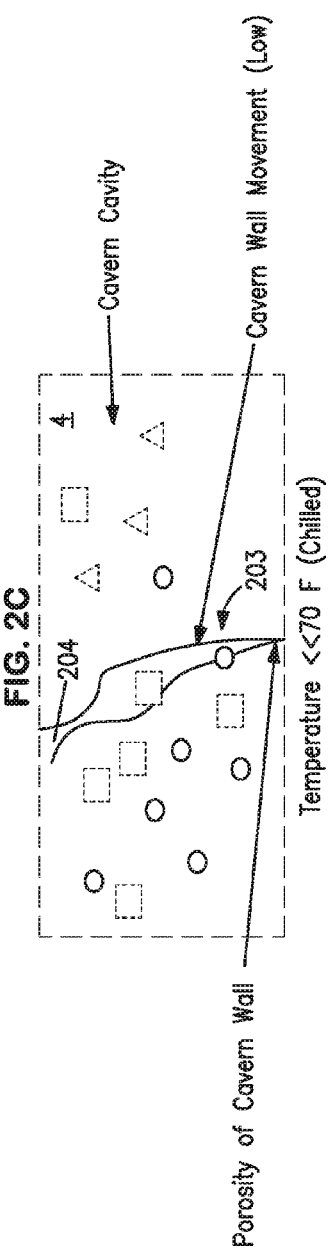

SYSTEM AND METHOD FOR TREATING HYDROGEN TO BE STORED IN A SALT CAVERN AND SUPPLYING THEREFROM

FIELD OF THE INVENTION

The present invention relates to a novel system and method for treating hydrogen to be stored in a salt cavern and supplying hydrogen from the salt cavern. Particularly, the treatment process involves cooling hydrogen product and/or a crude hydrogen stream that is withdrawn from the salt cavern.

BACKGROUND OF THE INVENTION

Hydrogen is supplied to customers connected to a hydrogen pipeline system. Typically, the hydrogen is manufactured by steam methane reforming in which a hydrocarbon and steam are reacted at high temperature in order to produce a synthesis gas containing hydrogen and carbon monoxide. Hydrogen is separated from the synthesis gas to produce a hydrogen product stream that is introduced into the pipeline system for distribution to customers that are connected to the pipeline system. Alternatively, hydrogen produced from the partial oxidation of a hydrocarbon can be recovered from a hydrogen rich stream.

Typically, hydrogen is supplied to customers under agreements that require availability and on stream times for the steam methane reformer or hydrogen recovery plant. When a steam methane reformer is taken off-line for unplanned or extended maintenance, the result could be a violation of such agreements. Having a storage facility to supply back-up hydrogen to the pipeline supply is therefore desirable in connection with hydrogen pipeline operations. Considering that hydrogen production plants on average have production capacities that are roughly 50 million standard cubic feet per day or greater, a storage facility for hydrogen that would allow a plant to be taken off-line, to be effective, would need to have storage capacity in the order of 1 billion standard cubic feet or greater.

Additionally, there are instances in which customer demand can exceed hydrogen production capacity of existing plants. The storage facility allows excess hydrogen to be temporarily stored and subsequently available for back-up supply to assist in meeting customer demand when, for example, a steam methane reformer is unable to meet customer demand.

The large storage capacity can be met by means of salt caverns to store the hydrogen underground. Salt caverns are large underground voids that are formed by adding fresh water to the underground salt, thus creating brine. This formation process is often referred to as solution mining. Caverns are common in the gulf states of the United States where demand for hydrogen is particularly high. Hydrogen storage has taken place where there are no purity requirements or less stringent (<95% purity) requirements placed upon the hydrogen product. In such case, the stored hydrogen from the salt cavern can be removed from the salt cavern without further processing.

However, utilizing a salt cavern to assist in the supply of higher purity hydrogen of at least 95% purity or greater is challenging. Stored hydrogen within the salt cavern has a tendency to become contaminated by intrusion of several contaminants, which can include, by way of example, water vapor, hydrocarbons, sulfur-containing compounds and/or carbon dioxide. Contamination of the stored hydrogen requires removal of one or more contaminants from the stored hydrogen when withdrawn as a crude hydrogen stream from the salt cavern. Methods have been implemented to ensure that impurities imparted by the salt cavern to the stored hydrogen do not deleteriously impact the hydrogen product in the pipeline. For example, U.S. Pat. No. 7,078,011 removes at least carbon dioxide and water vapor from a crude hydrogen stream withdrawn from a salt cavern to produce a hydrogen product stream having an impurity level at or below a product purity specification. U.S. Patent Pub. No. 2013/021349 removes crude hydrogen from a salt cavern and then dilutes the crude hydrogen with higher purity hydrogen from a hydrogen pipeline to form a resultant hydrogen product stream at or below a product purity specification. U.S. Pat. Nos. 8,425,149 and 8,757,926 maintain a minimum quantity of stored hydrogen within the salt cavern to create a stagnant layer having carbon dioxide contained therein. A portion of stored hydrogen is withdrawn from the salt cavern without disturbing the stagnant layer to prevent carbon dioxide contamination from being drawn into the stored hydrogen stream, thereby allowing the stored hydrogen stream to be reintroduced into the hydrogen pipeline without carbon dioxide removal. These methods disclosed in U.S. Patent Publication No. 2013/021349 and U.S. Pat. Nos. 7,078,011; 8,425,149; and 8,757,926, each of which is incorporated by reference herein in its entirety, require additional processing steps, which can add complexity to the hydrogen flow network that is in communication with the salt cavern, as well as potentially increasing capital and operating expenditures.

Additionally, the ability to utilize a salt cavern to assist in the supply of higher purity hydrogen without leakage through the salt cavern walls is difficult based on the properties of hydrogen. Hydrogen is the smallest and lightest element within the periodic table of elements, having an atomic radius measuring 25 pm+/−5 pm. Consequently, higher purity hydrogen is typically considered one of the most difficult elements to contain within underground salt formations without measurable losses through the salt cavern walls. For example, storing large quantities (e.g., greater than 100 million standard cubic feet) of pure (e.g., 99.99%) gaseous hydrogen in underground salt caverns consisting of a minimum salt purity of 75% halite (NaCl) or greater without measurable losses of the stored hydrogen—from the salt cavern can present challenges. Methods for containing hydrogen within a salt cavern without incurring significant leakage have been addressed. U.S. Pat. No. 8,690,476, which is incorporated by reference herein in its entirety, creates a permeation barrier along the walls of the cavern that allows high purity hydrogen to be stored therein. U.S. Patent Pub. No. 2014/0161533, which is incorporated by reference herein in its entirety, discloses monitoring and regulating the pressure of the stored hydrogen in the salt cavern between a predetermined lower limit and a predetermined upper limit.

As will be discussed, among other advantages of the present invention, an improved method and system for treating hydrogen to be stored in a salt cavern and supplying therefrom is disclosed.

SUMMARY OF THE INVENTION

The invention relates, in part, to a method and system for storing hydrogen in a salt cavern. It has been found that cooling compressed hydrogen product prior to introduction into a salt cavern suppresses the intrusion of one or more contaminants from the salt cavern walls into the interior cavity of the salt cavern. Alternatively or in addition thereto, the chilling may be performed upon withdrawal of a crude hydrogen stream from the salt cavern. The methods and system of the present invention are conducive for the storage of hydrogen, and preferably higher purity hydrogen from at least 95% up to about 99.999% or greater.

In a first aspect, a method for treating a moisture-containing hydrogen product to be stored in a salt cavern is provided, comprising: removing hydrogen product from a hydrogen pipeline; compressing the hydrogen product to produce a compressed hydrogen product; cooling the compressed hydrogen product to a temperature sufficient to condense a portion of water vapor; removing the water vapor condensate to produce a compressed and chilled hydrogen product; and introducing the compressed and chilled hydrogen product into the salt cavern to produce chilled and stored hydrogen within the salt cavern.

In a second aspect, a system for storing hydrogen product in a salt cavern, comprising: a compressor configured to pressurize hydrogen product within the salt cavern to form stored hydrogen; a chiller configured to remove at least water vapor from the hydrogen product, said chiller in fluid communication with the compressor; a collection/liquid-vapor vessel configured to collect and accumulate at least the removed water vapor condensate, said collection vessel located downstream and in fluid communication with the chiller; a flow network positioned between the salt cavern and the compressor, the chiller and the collection vessel, said flow network comprising a first leg and a second leg; the first leg in flow communication with the salt cavern to introduce hydrogen product into the salt cavern to form stored hydrogen that is optionally chilled to a temperature sufficient to remove a portion of water vapor to produce an optionally chilled and stored hydrogen product; and the second leg in flow communication with a hydrogen pipeline and the first leg to withdraw the stored and optionally chilled hydrogen from the salt cavern.

In a third aspect, a method for supplying hydrogen to a hydrogen pipeline from an underground hydrogen storage cavern, comprising: withdrawing a crude hydrogen stream from the underground hydrogen storage cavern, the crude hydrogen stream comprising one or more contaminants imparted by the underground hydrogen storage cavern; separating at least a portion of the one or more contaminants as a condensate from the crude hydrogen stream to produce a hydrogen product; and introducing the hydrogen product into the hydrogen pipeline to supply the additional hydrogen to the pipeline.

In a fourth aspect, an underground hydrogen storage cavern formed by solution mining an underground salt formation to form an interior cavity defined, at least in part, by salt cavern walls and filling the interior cavity with a compressed and chilled hydrogen gas, wherein the salt cavern walls has been modified to be cooled along at least a portion of the salt cavern walls with the compressed and chilled hydrogen gas.

In a fifth aspect, a method for repairing an underground salt cavern, comprising the steps of: detecting a temperature excursion within a zone of the cavern, said zone determined to be susceptible to leakage of stored hydrogen; increasing cooling of the compressed hydrogen stream to produce a cooler compressed hydrogen; and introducing the cooler compressed hydrogen stream into the cavern to chill the stored hydrogen therein and thereby stabilize said zone to substantially reduce the leakage of the stored hydrogen into the zone.

In a sixth aspect, method for operating an underground salt cavern, comprising the steps of: detecting one or more contaminants in a crude hydrogen stream withdrawn from the cavern to exceed a product purity specification; increasing cooling of the compressed hydrogen stream; increasing cooling of the crude hydrogen stream that is withdrawn from the cavern; wherein the cooling of the compressed hydrogen stream and the cooling of the crude hydrogen stream enables lowering and maintaining of the one or more contaminant at or below a product purity specification.

In a seventh aspect, a method for treating a hydrogen stream comprising water vapor and one or more contaminants derived from a hydrogen source, comprising the steps of: removing hydrogen product from the hydrogen source; cooling the hydrogen product to a temperature sufficient to condense at least a portion of the water vapor and said one or more of said contaminants; and removing at least a portion of said water vapor and at least a portion of said one or more contaminants.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 2a is an exploded side view portion of the salt cavern walls and shows a representative release of contaminants from the walls into the salt cavity when the stored hydrogen has not been chilled;

FIG. 2b is an exploded side view portion of the salt cavern walls and shows a representative release of contaminants from the walls into the salt cavity when the stored hydrogen has been cooled within a temperature ranging from 70 F to 117 F prior to its introduction into the salt cavity;

FIG. 2c is an exploded side view portion of the salt cavern walls and shows a representative release of contaminants into the salt cavity when the stored hydrogen has been cooled to a temperature below 70 F but above its condensation temperature prior to introduction into the salt cavity.

DETAILED DESCRIPTION OF THE INVENTION

As used herein, all concentrations are expressed as volumetric percentages. The disclosure is set out herein in various embodiments and with reference to various aspects and features of the invention. The detailed description contemplates the features, aspects and embodiments in various permutations and combinations, as being within the scope of the disclosure. The disclosure may therefore be specified as comprising, consisting or consisting essentially of, any of such combinations and permutations of these specific features, aspects, and embodiments, or a selected one or ones thereof.

It should be understood that the term "suppress" as used herein means a reduction, inhibition or delay in the onset of infiltration by one or more contaminants released from the salt walls into the interior cavity of the salt cavern. It should be understood that the term "chilled" as used herein means a cooling of hydrogen product removed from a hydrogen pipeline in which the cooling occurs prior to introduction into a salt cavern; or a cooling of a hydrogen stream that is withdrawn from a salt cavern; or a combination of cooling of hydrogen product prior to introduction into the salt cavern and withdrawal of at least a portion of stored hydrogen from the salt cavern as a hydrogen stream. The terms "chilling" and "cooling" as used herein are used interchangeably and are intended to have the same meaning. The term "crude hydrogen" is intended to refer to one or more of the contaminants contained within a salt cavern which infiltrates through the walls of the salt cavern into the stored hydrogen to a degree where subsequent purification may be required prior to its return to a hydrogen pipeline in order to acquire a hydrogen purity level at or below a product purity specification. The term "condensate" as used herein means liquefied water vapor and optionally one or more other contaminants contained within a hydrogen pipeline, flow network or salt cavern formation, including, but not limited to, hydrocarbons, carbon dioxide or sulfur-containing compounds, which undergo condensation.

It should be understood that the present invention as will be described herein is applicable to any type of underground storage cavern that is employed for the storage of gases, preferably hydrogen. Examples of underground hydrogen storage caverns include geological storage facilities such as lined hard rock caverns, depleted gas/oil reservoirs, aquifers and sedimentary basins. In a preferred embodiment as will be described herein, the underground hydrogen storage cavern is a salt cavern formation.

Figure 1:
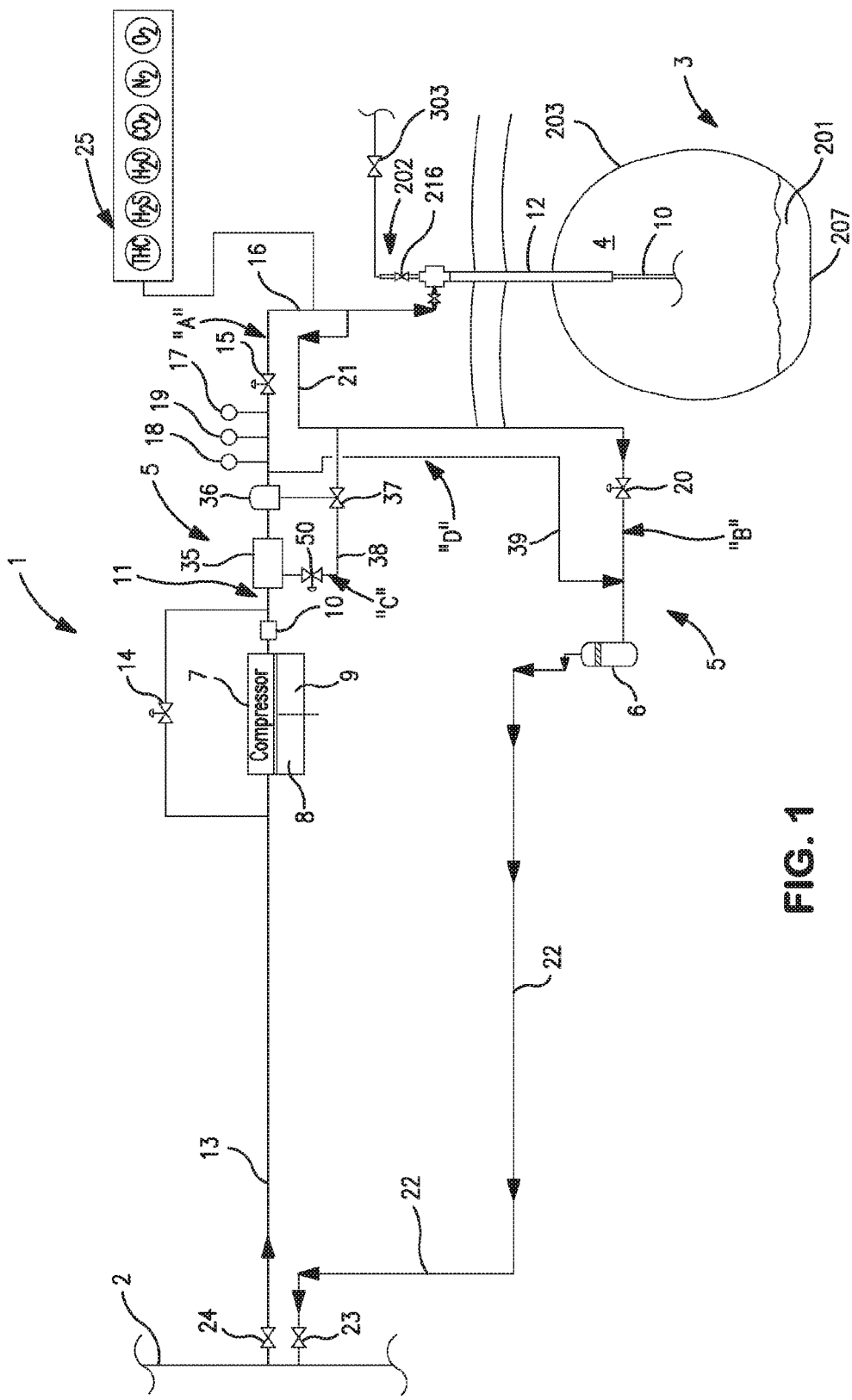
FIG. 1 shows a fragmentary schematic of a protocol for introducing and storing chilled hydrogen in a salt cavern incorporating the principles of the invention.

As known in the art, the salt cavern 3 is formed by solution mining in which water is injected through a pipe known as a brine string 10 (FIG. 1). The water dissolves the salt to form a brine solution. The resulting brine solution during the mining operation is returned through the annular space (not shown) formed in the final well casing 12 or other conduit between the inner wall of the final well casing 12 and the outer wall of the brine string 10. After the solution mining operation is complete, residual brine in the salt cavern 3 can be removed through the brine string 10 by pressure displacement resulting from the injection of hydrogen through the final casing 12 or other conduit. Once the brine level reaches the bottom of the brine string 10, a top section of the brine string 10 is sealed off by valve 216 and a residual brine layer 201, also known as a brine sump, may remain in the salt cavern 3 at the bottom portion 207 of the salt cavern 3. The resultant salt cavern 3 is defined, at least in part, by an interior region or cavity that is bounded by the salt cavern walls 203.

The salt cavern walls 203 of the salt cavern 3 consist of rock, salt or halite which tends to deposit into thick layers over time. The deposited layers are gradually covered and buried by overburden sediments. The weight or pressure of such overburden sediments causes the salt formations to form densified and stratified structures, which tend to undergo viscoplastic slippage or deformation, which can lead to the formation of microcracks. The viscoplastic slippage or deformation causes the grains of the salt cavern walls 203 to possess an inherent porosity. Depending upon the structural configuration and properties of the salt cavern walls 203, localized portions of the salt cavern walls 203 may contain inherent porosities large enough for contaminants contained therein to pass therethrough and enter into the interior cavity of the salt cavern 3 where the stored hydrogen 4 is maintained. The result is potential contamination of the stored hydrogen 4 such that a crude hydrogen stream 21 may form, which may require subsequent purification or dilution prior to introduction into the hydrogen product pipeline 2. Various contaminants are contemplated, including, by way of example and not intending to be limiting, water vapor, carbon dioxide, sulfur-containing compounds or hydrocarbon molecules (e.g., light hydrocarbons such as methane).

In contrast to prior techniques which have implemented purification or dilution of the crude hydrogen stream 21 upon its withdrawal from the salt cavern 3, one aspect of the present invention offers a novel approach for suppressing contamination of stored hydrogen 4 within the salt cavern 3. In particular, the present invention has discovered that suitable chilling of a compressed hydrogen product stream 11 (FIG. 1) prior to introduction into the salt cavern 3 suppresses the onset of infiltration of one or more of the contaminants from the cavern salt walls 203 into the interior cavity of the cavern 3. The chilling of the compressed hydrogen product stream 11 enables selective removal of at least water vapor by cooling the compressed hydrogen product stream 11 to a temperature at which water vapor condenses from the compressed gas stream 11 (i.e., at or below the water dew point of the compressed gas stream 11) while retaining hydrogen in the gas phase. Removal of water vapor condensate creates a chilled and compressed hydrogen stream 16 (FIG. 1). In this manner, a sufficiently dry hydrogen stream 16 can be introduced into the salt cavern 3 which has greater capacity to absorb any water vapor contained within the salt cavern 3 or the salt walls 203 thereof, such that the amount of water vapor required to be subsequently removed upon withdrawal of the stored hydrogen 4 from the cavern 3 as stream 21 is entirely eliminated or substantially reduced. It should be understood that other contaminants, if present, may also be removed by cooling the compressed hydrogen product stream 11 to their respective condensation temperatures.

In accordance with an embodiment of the present invention and with specific reference to FIG. 1, a hydrogen storage and processing facility 1 is illustrated that is designed to remove hydrogen product 13 from a hydrogen pipeline 2 during periods of low customer demand, compress the hydrogen product 13 to form a compressed hydrogen product 11, chill the compressed hydrogen product 11 to form a compressed and chilled hydrogen product 16 and then introduce the compressed and chilled hydrogen product 16 into the salt cavern 3 as stored hydrogen 4. The chilling occurs in a chiller 35 where the temperature of the compressed hydrogen product 13 is sufficiently reduced to condense at least a portion of water vapor contained with the compressed hydrogen product 11. Water vapor condenses and is thereafter collected as condensate in the liquid-vapor separator 36.

When customer demand for the hydrogen, supplied by hydrogen pipeline 2 is low, or for any reason, production exceeds demand, the hydrogen stream 13 can be removed from the hydrogen pipeline 2 or alternatively received from another hydrogen production facility or storage source (not shown) and introduced into the salt cavern 3. "Hydrogen pipeline" or "hydrogen product pipeline" as used herein is intended to refer any conduit or passageway extending between the salt cavern 3 and the hydrogen production facility or storage source. In this regard, referring to FIG. 1, valve 24 is open to allow a portion of the product hydrogen in pipeline 2 to enter leg "A" of flow network 5 as hydrogen product stream 13. As used herein and in the claims, the term "legs" means flow paths within the flow network 5 that are formed by suitable conduits. Such conduits would be positioned to conduct the flow of the hydrogen streams within the flow network 5 as illustrated in FIG. 1. Bypass valve 14 is set in a closed position, valve 15 is set in an open position, valves 20, 37 and 50 are closed and valve 303, which may direct brine to and from a brine pond along a brine return line, is set in a closed position. Hydrogen stream 13 is compressed in a hydrogen compressor 7 to produce a compressed hydrogen stream 11. Hydrogen compressor 7 can be any known compressor as used in the art, and is typically a compressor having a reciprocating piston. The amount of compression will at least be partially dependent upon the pressure of the stored hydrogen 4 in the salt cavern 3. In a preferred embodiment, the hydrogen compressor 7 incorporates a first stage 8 and a second stage 9 in series with interstage cooling between stages and an aftercooler 10, which is preferably employed to remove the heat of compression. In one example, the aftercooler 10 is a shell and tube heat exchanger or other conventional heat exchanger whereby the heat of compression from the compressed hydrogen stream 11 is removed by cross exchanging the hydrogen stream 11 with a coolant, such as chilled water or other suitable chilled refrigerant.

After removing the heat of compression, the compressed hydrogen stream 11 enters a chiller 35 to sufficiently lower the temperature of the stream 11 such that at least a portion of water vapor is condensed. The chilling unit 35 may be any conventional chiller as known in the art, including an absorption chiller or a vapor chiller. Generally speaking, the chiller has various components, including a compressor, evaporator and condenser. The components are commercially available as part of a conventional chiller unit to perform a single stage vapor compression cycle. Each of the components is designed and specifically configured to process a suitable refrigerant which circulates through the components as part of a cooling cycle. Illustration of the chilling unit 35 in FIG. 1 has been simplified by omitting the various components in order to better convey and describe the process of the present invention. The chilling unit 35 performs a cooling cycle under conditions whereby the refrigerant in the liquid phase undergoes a phase change into the gas phase by means of an evaporator. As the liquid refrigerant passes through coils or tubes of the evaporator, it absorbs heat from water vapor contained in the compressed hydrogen stream 11, thereby cooling—at least a portion of the water vapor to a temperature sufficient for its condensation to occur. In one embodiment, the compressed hydrogen stream 11 is reduced in temperature to less than about 200 F but greater than the liquefaction temperature of hydrogen, or preferably in a range between 70 F and 117 F or more preferably less than about 70 F but greater than the liquefaction temperature of hydrogen. Alternatively, the compressed hydrogen stream 11 may be chilled to a temperature that allows a portion of one or more other contaminants in compressed hydrogen stream 11 to be condensed. The extracted heat is then carried by the refrigerant gas from the evaporator as a low-pressure gas through a conduit, such as a hose or line, towards the low side of the compressor of the chiller unit 35.

The refrigerant gas is then compressed by the compressor of the chiller unit 35 to a superheated vapor having a temperature and pressure at which it can be cooled in the condenser. The superheated vapor is routed to the condenser where it is reduced to a low pressure to convert the refrigerated gas to a refrigerated liquid, which is available to cool additional compressed hydrogen stream 11 and condense water vapor and any other contaminants. Prior to entering the evaporator, the refrigerated liquid may pass through an expansion valve that partially flashes a portion of the liquid to produce a liquid and vapor refrigerant mixture to ensure the refrigerant attains a temperature that is colder than the temperature of the moisture and/or other contaminants to be condensed. This vapor-compression cycle can be repeated— as needed to lower the overall temperature of the compressed hydrogen stream 11.

The level of chilling required to condense moisture will be based, at least in part, on the water dew point of hydrogen. The water dew point will be dependent upon several factors, including the pipeline moisture content and the pressure of the compressed hydrogen stream 11. For example, at 2000 psig and 10 ppmv water, the dew point is about −20 F. At 2000 psig and 1 ppmv water, the water dew point is about −190 F. It should be understood that the present invention can be carried out with any level of moisture contained in the hydrogen stream 11. In one example, the moisture level is 1% or less. In another embodiment, the moisture level is 1000 ppm or less.

Still referring to FIG. 1, the condensate enters a vapor-liquid separator 36 where it is separated and removed from the compressed hydrogen stream 11. Any suitable type of vapor-liquid separator may be employed. For example, a liquid coalescer as commercially available may be utilized whereby condensate droplets enter a housing and flow through filter media matrix, passing from inside to outside or vice versa. The coalesced condensate merges and agglomerates into larger droplets as they pass through the one or more layers of filter media matrix in the coalescer. After passing through the one or more layers of the filter media matrix, the larger droplets are separated from the compressed hydrogen stream 11 by gravity. The compressed hydrogen stream 11 exits the housing of the coalescer through an outlet port being preferably substantially devoid of condensate contaminant. A resultant chilled and compressed hydrogen stream 16 that is sufficiently dry can now be introduced into the salt cavern 3.

In this regard, the chilled and compressed hydrogen stream 16 continues to flow through the first leg "A". The chilled and compressed hydrogen stream 16 thereafter enters well-casing or conduit 12 (FIG. 1), which is connected to a transfer well head assembly 202, and thereafter into an annular flow area (not shown) within final well casing 12 (between the inside of final well casing 12 and brine string 10) from which the compressed hydrogen feed stream 16 enters salt cavern 3. Flow orifice meter 17, pressure transmitter 18 and temperature transmitter 19 can be used to determine the quantity of compressed hydrogen stream 16 that is introduced into the salt cavern 3.

Referring to FIG. 1, the chilled and compressed hydrogen stream 16 enters salt cavern 3 to form stored hydrogen 4 in a chilled or cooled state. The stored hydrogen 4 exhibits coolant properties that the present invention recognizes can be utilized for cooling the salt cavern walls 203. At least a portion of the chilled and stored hydrogen 4 contacts a localized portion of the salt cavern walls 203 from which heat is extracted to reduce its temperature. As will be explained with reference to FIGS. 2B and 2C, the one or more layers 204 of the localized portion of the walls 203 attains a stabilized state whereby contaminant release from the walls 203 is suppressed.

FIGS. 2A-2C show a localized region or section of the walls 203 of the salt cavern 3 of FIG. 1. The walls 203 of the salt cavern 3 can be characterized by one or more layers 204 which are stratified. The chilled and stored hydrogen 4 absorbs heat from at least a portion of the layers 204, thereby reducing the temperature of the one or more layers 204. The reduction in temperature suppresses contaminant infiltration into the stored hydrogen 4.

The temperature of the one or more layers 204 is sufficiently reduced such that they may constrict. The constriction can occur to a point where certain localized regions of the walls 203 acquire an inherent porosity between the layers that is too small in size for contaminants such as hydrocarbons, water vapor and carbon dioxide to infiltrate therethrough. Alternatively, or in addition thereto, the viscoplastic slippage of the layers 204 is reduced upon cooling by the chilled stored hydrogen gas 4 such that movement of the layers 204 relative to each other is suppressed. Less movement of the layers 204 occur, which can translate into less release of contaminants from the layers 204 into the salt cavern 3. The reduction in movement may cause a substantial portion of the contaminants to remain entrapped therebetween.

The phenomenon by which the chilled stored hydrogen 4 may suppress contaminant release will be explained in conjunction with FIGS. 2A-2C. Each of the FIGS. 2A-2C represents an exploded side-view portion of the salt cavern wall 203 spanning a particular cavern depth. Cavern depth, designated as "d", is shown increasing in the direction of the downward vertical arrow. For purposes of comparison, the FIGS. 2A, 2B and 2C are intended to show a side view of salt walls 203 along the same range of cavern depth, d. FIG. 2A is intended to show a representative amount of the contaminants within the cavern 3 after unchilled stored hydrogen 4 has been introduced therein. FIGS. 2B and 2C are intended to show a representative amount of the contaminants within the cavern 3 after varying degrees of cooling have been imparted to the cavern walls 203 by the stored and chilled hydrogen 4 introduced therein. As such, each of the FIGS. 2A-C represents a different scenario that may occur depending on whether the stored hydrogen 4 is chilled prior to being introduced into the salt cavern 3. The presence of lines represents the salt cavern wall 203 as a series of individual layers 204 which are stratified. Although shown as continuous lines, it should be understood that each layer 204 contains some degree of porosity which is subject to being altered, at least in part, upon contact with the chilled and stored hydrogen 4, and the degree of cooling incurred by the salt cavern walls 203 by the chilled and stored hydrogen 4. However, for purposes of clarity and illustrating the principles of the present invention, the salt cavern walls 203 are intentionally shown simplified with the omission of certain structural features and details. The number of curved lines is intended to show the degree of movement of the layers 204. In this regard, FIG. 2A is intended to indicate more movement of layers 204 than FIG. 2B. Similarly, FIG. 2B is intended to indicate more movement of layers 204 than FIG. 2C.

A legend with different shapes is utilized to represent the various types of contaminants within the salt cavern 3. It should be understood that the legend is not an exhaustive list of all possible contaminants that may be encountered during storage of hydrogen 4 in the salt cavern 3. Additionally, the relative sizes of the various contaminants are not shown to scale.

FIG. 2A represents a baseline case in which stored hydrogen 4 has not been chilled after being compressed. As a result, the resultant stored hydrogen 4 may have a temperature exceeding well beyond 117 F. No cooling of the salt walls 203 occurs. As a result, the salt cavern walls 203 are shown as unstable. Specifically, movement of one or more layers 204 relative to one other by a mechanism such as viscoplastic slippage can occur which induces contaminant release across layers 204 into the cavern 3. To illustrate this concept, FIG. 2A shows a molecule of methane, designated as circular-shaped, entrapped within one of the layers 204 that can pass through the porosity that become enlarged as a result of relative movement of the layers 204. The dotted arrow designated "L" is intended to show the migration path of the methane molecule across the enlarged pores of the layers 204 into the interior cavity of the cavern 3. The enlarged pores are large enough for the methane to pass therethrough. The molecules to the right of the salt cavern wall 203 represent the total number of contaminants which have seeped through the layers 204 at a particular cavern depth after the stored hydrogen 4 has been injected into the cavern 3.

Similarly, molecules of carbon dioxide designated as rectangular shaped may also migrate through layers 204 and into the interior cavity of the cavern 3. FIG. 2A shows three molecules of carbon dioxide entrapped within layers 204. The migration of the carbon dioxide molecules across layers 204 (designated by the dotted arrows "H", "I" and "J") may be induced by enlarged pores that are created upon movement of the individual layers 204. The movement of the layers 204 causes the entrapped methane molecules to be released or dislodged and then migrate across the enlarged pores of the layers 204 into the interior cavity of the cavern 3.

Additionally, the temperature of the salt cavern 3 may increase as a result of the introduction of hydrogen. Hydrogen by virtue of its negative Joule Thompson coefficient can raise the temperature of the cavern 3 upon expansion into the interior region of the cavern 3. The rise in temperature may create thermal shock or stresses. The thermal stresses can induce fracture and cracks along the layers of the salt cavern walls 203 that may induce newly created pores for contaminants to pass therethrough and/or enlarge exiting pores. In this regard, another carbon dioxide molecule that is shown located within the inner portion of the walls 203 of the salt cavern 3 migrates across enlarged pores which may be created as a result of stress-induced fractures and cracks. The carbon dioxide molecule seeps across the layers 204 as shown by the dotted arrow designated "K". The porosity of the fractures can provide sufficient permeability for contaminant movement and release into the interior region of the cavern 3.

FIG. 2B shows stored hydrogen 4 which has been moderately chilled prior to introduction into the cavern 3. The cooling as has been described herein is performed to lower the temperature of the compressed hydrogen stream 16 to a range from about 70 F to about 117 F. Cooling of at least a portion of the salt walls 203 is expected to occur, thereby creating salt cavern walls 203 which constrict and incur decreased movement of its individual layers relative to that of FIG. 2A. As can been seen, less overall contaminant seepage has occurred upon chilling in FIG. 2B in comparison to FIG. 2A. The total number of overall contaminants shown in FIG. 2B within the interior cavity of the salt cavern 3 is less than that of FIG. 2A.

The layers 204 of the salt cavern walls 203 are less susceptible to movement and therefore have a tendency to exhibit mild movement in comparison to FIG. 2A. In this regard, FIG. 2B shows a molecule of carbon dioxide that passes through pores of the individual layers 204 of the salt cavern walls 203 having a migration path designated "M". However, the layers 204 situated in closer proximity to the stored and chilled hydrogen 4 exhibit greater cooling effects than the layers 204 extending farther away from the stored and chilled hydrogen 4. The cooler layers 204 may undergo less movement than the layers 204 extending farther away from the stored and chilled hydrogen 4. As a result, the degree of constriction and resultant porosity associated with these layers 204 can be too small for the carbon dioxide molecule to continue migration. The carbon dioxide molecule can become entrapped within the layers 204 as shown by the deflected arrow in FIG. 2B designated "M".

Other localized regions of the layers 204 in FIG. 2B may be more susceptible to layer movement as the chilled and stored hydrogen 4 occupies and pressurizes the interior cavity of the cavern 3. This may be attributable as a result of the layers 204 in a particular localized region having an inherent geological formation with greater porosity or more intense cracked fractures that potentially cause cracked fissures. Alternatively, or in addition thereto, the localized regions may incur less cooling as a result of being situated at a greater cavern depth, whereby the temperature of the cavern increases with increasing cavern depth (FIG. 3), by virtue of the geothermal heat gradient created by the earth itself. The net result is potentially greater instability at this region within the cavern 3 where a molecule of carbon dioxide at the greater cavern depth "d" is able to pass through the layers 204 and into the interior cavity of the salt cavern 3, as shown by the dotted arrow designated "N" associated with the migration path of carbon dioxide which entirely traverses the layers 204 of the cavern wall 203 into the interior cavity of the salt cavern 3. Similarly, a molecule of methane at the greater cavern depth is able to pass through layers 204 and into the cavern 3, as shown by the dotted arrow designated "O".

FIG. 2C shows stored hydrogen 4 which has been chilled prior to injection into the cavern 3. Cooling as has been described is performed to lower the temperature of the compressed hydrogen stream 16 to a range well below 70 F but above the liquefaction temperature of hydrogen. In comparison to FIG. 2B, a greater amount of cooling of the salt walls 203 is expected to occur, thereby creating salt cavern walls 203 which undergo more constriction and remain in the constricted state for a greater amount of time. As a result, the walls 203 incur decreased movement of its individual layers 204 for a greater amount of time, as shown by less number of lines in FIG. 2C. In this regard, FIG. 2C shows a molecule of carbon dioxide and a molecule of methane entrapped without any tendency to be dislodged or migrate across the layers 204. The total number of overall contaminants shown in FIG. 2C within the interior cavity of the salt cavern 3 is less than that of FIG. 2B as a result of less overall contaminant seepage occurring upon chilling in FIG. 2C in comparison to FIG. 2B. The layers 204 in FIG. 2C represent regions of substantially reduced porosity by virtue of their increased cooling in comparison to FIG. 2B. The reduced porosity along regions of the salt walls 203 may also occur to a degree whereby confinement of the molecules of the stored hydrogen 4 within the cavern 3 is achieved without substantial leakage through the salt cavern walls 203.

Although a substantial reduction of contaminant seepage has occurred, some contaminant infiltration within the interior cavity of the salt cavern 3 still may occur, as shown by the presence of contaminants to the right of the salt cavern wall 203 in FIG. 2C. However, the present invention offers the ability to substantially reduce the rate and overall amount of contaminant infiltration by cooling at least a portion of the salt cavern walls 203. It should be noted that the exact amount of heat required to be absorbed by the chilled stored hydrogen 4 from the salt cavern walls 203 can vary upon numerous factors, including the specific configuration of the individual layers 204 of the salt cavern walls 203, such as the salt composition and degree of stratification of the layers 204 and tendency for the layers to undergo movement in response to, for example, viscoplastic slippage and temperature excursions.

Figure 3:
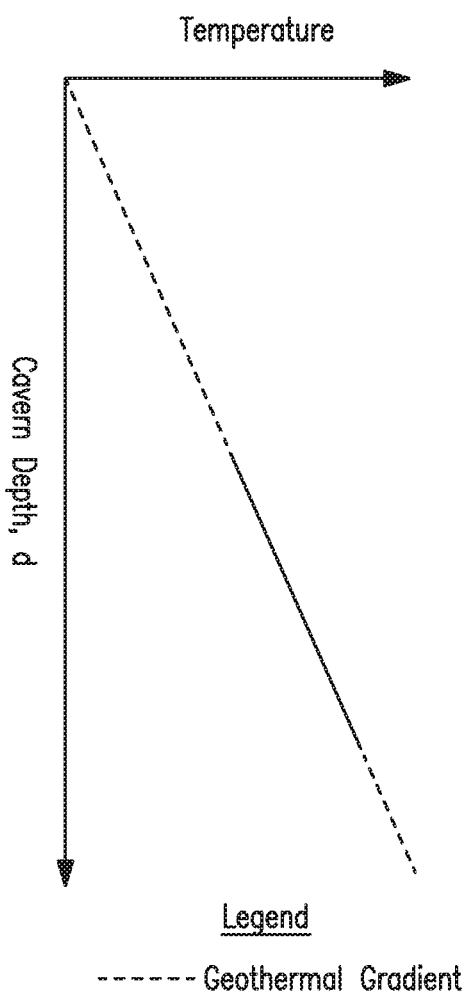
FIG. 3 shows a representative geothermal gradient as a function of cavern depth.

FIG. 2A indicates that in the absence of chilling the compressed hydrogen 16 that is introduced into the salt cavern 3 can increase the temperature of the cavern 3 as a result of the negative Joule Thompson coefficient (i.e., temperature increase upon hydrogen expansion) of hydrogen. The temperature excursions are intensified when taking into consideration that the natural geothermal gradient has a tendency to increase linearly as a function of greater cavern depths (FIG. 3). The present invention recognizes that such temperature excursions can have a deleterious effect on cavern stability. Salt has a coefficient of thermal expansion several factors greater than most rock, whereby temperature changes in the salt cavern can impose tensile stress increases due to such thermal expansion. The thermal shock or stresses which are generated can induce fracture and cracks along the layers of the salt cavern walls that promote newly created pores for contaminants to pass therethrough. Accordingly, the injection of hydrogen into the cavern 3 without chilling of hydrogen can lower cavern stability.

FIGS. 2B and C indicate that depending upon the degree of cooling, the one or more layers 204 of the salt cavern walls 203 can undergo decreased movement relative to each other in a manner that reduces the sizes of the pores such that at least some of the contaminants are unable to migrate therethrough and release into the interior cavity of the cavern 3 to contaminate the stored hydrogen 4. Further, the constricted state of the chilled layers 204 causes contaminants to remain entrapped therebetween.

Effectiveness of the cooling can be assessed with temperature measurements. Placement of temperature gauges at different depths within the cavern 3 allows for the capability to assess sufficiency of cooling. Downhole temperature gauges extending through the well-casing or conduit 12 of the cavern well head assembly 202 may be positioned at various depths of the cavern 3 to measure temperature of the stored hydrogen 4. Several downhole temperature gauges can extend through the conduit 12 and be positioned at a predetermined location within the stored hydrogen 4. The temperature measurements determine whether the salt walls 203 at a particular cavern depth, d, are being sufficiently cooled by the chilled and stored hydrogen 4. Alternatively, wellhead temperature measuring devices, which may be located within the cavern wellhead assembly 202, can be utilized to detect temperature in the cavern 3. In this manner, the temperature measurements can be utilized to adjust the degree of cooling of compressed hydrogen stream 11 needed to impart necessary cooling of the salt cavern walls 203 prior to its introduction into the cavern 3. Additionally, the temperature gauges can be utilized to detect leakage of hydrogen on the basis of any temperature excursions in the cavern 3.

In an another embodiment, the cavern 3 can be defined as a collection of discrete zones whereby downhole temperature gauges can be selectively placed at incremental depths within the cavern 3 to obtain real-time temperature measurements within the zones. Collectively, the measurements define a real-time temperature distribution of the cavern 3. For example, a temperature gauge at a specific cavern depth may define a zone of the cavern 3. Each zone would span a predetermined depth and have a temperature gauge placed therein. It should be understood that more than one temperature gauge may be placed at the same cavern depth to obtain an average temperature at that particular zone. A temperature excursion detected by a particular temperature gauge within a certain zone may reveal leakage of a portion of the stored hydrogen 4 through the layers 204 (FIG. 2A) at that zone as a result of hydrogen's negative Joule Thompson coefficient. In response to the temperature excursion, the outlet temperature of the chiller 35 can be adjusted to increase cooling of the compressed hydrogen stream 11. A cooler compressed hydrogen stream 16 is produced which is then injected into the cavern 3 to chill the stored hydrogen 4. Injection of cooler compressed hydrogen stream 16 can continue until a sufficient amount of cooling occurs at the specific zone that is detected to be susceptible to leakage of the stored hydrogen 4. The cooling stabilizes the zone to a degree where stability or constriction of the layers 204 of the zone is achieved as explained in FIG. 2*b*, and most preferably FIG. 2*c*. As a result, leakage of the stored hydrogen 4 at a particular zone is substantially reduced or eliminated (FIG. 2B or 2C). In this manner, the present invention offers an in situ method for detecting leakage of stored hydrogen 4 within a certain zone of the cavern 3, and, thereafter, in response to such detection, increased cooling of the stored hydrogen 4 and walls 203 of the cavern 3 can achieve cavern stability and thereby heal or repair the cavern 3 at the specific zone.

Alternatively or in addition thereto, an analyzer bank 25 may be used to assist in detection of a cavern 3 having one or more zones susceptible to hydrogen leakage by detecting measurement of contaminant concentrations of the crude hydrogen stream 21 that is withdrawn from the cavern 3 in order to determine whether contaminant removal is necessary. The analyzer bank 25 measures the hydrogen purity level and concentration of impurities (e.g., $CH_4$, $CO_2$, $H_2O$, $H_2S$, $CO$, $N_2$ and $O_2$) within the crude hydrogen stream 21. The sampling of the crude hydrogen stream 21 is intended to be a representative measurement of the composition of the hydrogen and any contaminants contained in the stored hydrogen 4. Alternatively, an analyzer probe (not shown) or other suitable instrumentation as known in the art may be directly inserted into the well casing 12 for measurement of the hydrogen purity level and any other contaminants of the stored hydrogen 4 within the salt cavern 3. The measurement of any contaminant levels which exceed a product purity specification can be removed by routing the crude hydrogen stream 21 through the chiller 35 and/or liquid-vapor separator 36. Alternatively, the hydrogen stream 21 can be returned to the hydrogen pipeline 2 without routing to the chiller unit 35 and/or liquid-vapor separator 36 when measurements indicate each of the contaminant levels is at or below a product purity specification.

In a preferred embodiment, when one or more contaminants is detected by the analyzer bank 25 to exceed a product purity specification, increased cooling of the compressed hydrogen stream 11 is performed prior to its injection into the cavern 3, and increased cooling of the crude hydrogen stream 21 that is withdrawn from the cavern 3 is performed so as to reduce contaminant concentration. From an operational standpoint, performing cooling of the compressed hydrogen stream 11 prior to injection into the cavern 3 and performing cooling of the crude hydrogen stream 21 upon withdrawal from the cavern 3 can offer a novel method for ensuring contaminant concentration can be lowered and thereafter maintained at or below a product purity specification.

The present invention recognizes that the removal of water vapor prior to introduction of the compressed hydrogen stream 16 into the salt cavern 3 creates relatively drier stored hydrogen 4 within the interior of the salt cavern 3 that enhances the cooling properties of the chilled and stored hydrogen 4. In this regard, the presence of water vapor is preferably substantially reduced or eliminated to avoid degradation of the cooling properties of hydrogen. Still further, the reduction in water vapor may also reduce the onset of hydrogen embrittlement to the well casing 12.

Another potential benefit of water vapor removal prior to introduction of the compressed hydrogen stream 16 into the salt cavern 3 is increased absorption capacity of water vapor of the chilled and stored hydrogen 4. The chilling and removal of water vapor as condensate prior to introduction of the compressed and chilled hydrogen stream 16 into the salt cavern 3 creates a relatively dry stored hydrogen 4. In addition to improved cooling of the salt cavern walls 203, the chilled and stored hydrogen 4 can absorb more water vapor and still maintain the ability to remain at or below a product purity specification such that removal of water vapor is not required when the stored hydrogen is withdrawn. To the extent the water vapor absorbed by the stored hydrogen 4 exceeds the product purity specification, less water vapor may be required to be removed in comparison to stored hydrogen that is not chilled prior to introduction into the cavern 3. The need for less moisture removal can lower capital and operating costs associated with surface purification equipment. For example, the required sizing of adsorption beds in the present invention would be potentially smaller than of conventional storage caverns, as less water vapor (and potentially one or more other contaminants) would be required to be removed upon withdrawal of the stored hydrogen 4 from salt cavern 3 to achieve a product purity specification. In conventional storage caverns, the inherent porosity of the salt walls 203 due to cavern instability may contribute to release and infiltration of a larger amount of contaminants from the salt walls 203 into the interior cavity of the cavern 3, thereby requiring larger purification units (e.g., adsorption units). Accordingly, the present invention offers a unique process benefit with respect to the amount of surface purification equipment required when the stored hydrogen gas 4 is withdrawn from the cavern 3. Such a process benefit translates into a more cost effective hydrogen storage processing facility relative to conventional salt cavern hydrogen storage facilities. In this manner, the present invention anticipates and strategically plans for contaminant intrusion from a salt cavern 203 while also allowing the stored and chilled hydrogen 4 to have more absorption capacity for water vapor by virtue of entering the salt cavern 203 in a drier state.

Notwithstanding the benefits of removing moisture from the compressed hydrogen stream 16, it should be understood that the present invention can be carried out by cooling the compressed hydrogen stream 16, but not to an extent where moisture is condensed. The benefits of chilling to stabilize one or more layers 204 of the localized portion of the walls 203 can be achieved without moisture removal. In this regard, another embodiment of the present invention involves cooling the stream 16 to a temperature above its water dew point prior to introduction of the stream 16 into the cavern 3. The phenomena as explained in FIG. 2C occurs, but may occur to a lesser degree in comparison to a stream 16 that is cooled to a temperature below its water dew point.

There may be periods when demand for the hydrogen product exceeds the capabilities of the hydrogen pipeline 2 to supply hydrogen product to customers. For example, there may be instances when a hydrogen generation facility is taken off-line or when demand for hydrogen by customers otherwise exceeds the available production capabilities. In such scenarios, at least a portion of the stored and chilled hydrogen 4 can be removed from the salt cavern 3, and reintroduced into the hydrogen pipeline 2 to assist in the meeting of customer demand. In accordance with the principles of the present invention, the stored and chilled hydrogen 4 suppresses contaminant release from the cavern walls 203 to a degree where purification of the hydrogen 4 is not required upon its withdrawal from the cavern 3. At least a portion of the stored and chilled hydrogen 4 from the cavern 3 can be withdrawn and returned to the hydrogen product pipeline 2. Referring to FIG. 1, valves 15, 37 and 50 are closed and valve 20 is opened to allow at least a portion of the stored and chilled hydrogen 4 to be discharged from the cavern 3 as a hydrogen stream 21. Because the pressure of the stored and chilled hydrogen 4 is higher than that of the pipeline 2 in this particular example, the hydrogen stream 21 readily flows through the second leg "B" of flow network 5. When the appropriate amount of stored and chilled hydrogen 4 has been removed, valve 20 is closed to isolate the cavern 3.

In an alternative embodiment, the stored hydrogen 4 (which had been chilled prior to introduction into the cavern 3) can be withdrawn from the salt cavern 3 and then purified before introduction into the hydrogen pipeline 2. Such a mode of operation is preferred when contaminants such as brine are entrained with the stored hydrogen 4. Depending upon pressure and temperature, other contaminants may be dissolved within the brine. The contaminants can include, but are not limited to, carbon dioxide, hydrocarbons (e.g., methane), sulfur-containing compounds and moisture. Any suitable purification equipment can be implemented. In one embodiment, surface purification equipment such as temperature swing absorption or pressure swing absorption is employed. In another embodiment, the stored hydrogen 4 is entrained with saturated brine and withdrawn as a crude hydrogen stream 21 and then directed to the liquid-vapor separator 36 where the saturated brine with contaminants dissolved therein are removed from the crude hydrogen stream 21. Referring to FIG. 1, valve 15 and 20 is closed, valve 37 is opened and valve 50 is closed. The stored and chilled hydrogen 4 with saturated brine entrained therein is withdrawn as a crude hydrogen stream 21. The crude hydrogen stream 21 flows through a third flow leg "C" of flow network 5. The crude hydrogen stream 21 is directed to the liquid-vapor separator 36, which may be a liquid-vapor coalescer 36. The saturated brine droplets with contaminants dissolved therein merge and agglomerate into larger droplets as they pass through one or more layers of the filter media matrix of the coalescer. After emerging through the filter media matrix, gravity takes effect and the larger droplets are removed to produce a hydrogen stream 39 having contaminants at or below a product purity specification. The hydrogen stream 39 flows through a fourth flow leg "D" of flow network 5. The stream enters vessel 6 where any dust or rock salt particles are removed and hydrogen product emerges from vessel 6 as stream 22, which is substantially free of any solid debris. Stream 22 readily flows through the second leg "B" of flow network 5 and is exported into the product pipeline 2 with valve 23 set in the open position.

There may be instances where the brine is saturated with contaminants released from the salt cavern walls 203 so that additional gaseous contaminant release from the salt cavern walls 203 infiltrating into the stored and chilled hydrogen 4 remains in the vapor phase. In such a scenario, an embodiment of the present invention may be carried out where the stored hydrogen 4 entrained with saturated brine and gaseous contaminants are withdrawn as a crude hydrogen stream 21 that is redirected to the chiller 35 to chill and condense the contaminants. In this case, valves 15 and 20 are closed, valves 37 and 50 are open. The stored and chilled hydrogen 4 is withdrawn as a crude hydrogen stream 21 and directed into the chiller 35. The chiller 35 reduces the temperature of the stream 21 to a temperature sufficient for condensation of the vapor phase contaminants to occur. The hydrogen stream and condensate (i.e., saturated brine and condensed contaminants) thereafter enter the vapor-liquid separator 36 where the condensate and saturated brine are separated and removed from the compressed hydrogen stream 11. For example, a liquid coalescer may be utilized whereby condensate droplets are merged into larger droplets as they pass through one or more layers of filter media matrix in the coalescer. The larger droplets are then separated from the hydrogen by gravity. The condensed contaminants may be removed as a separate condensate stream from the brine which is saturated with contaminants. A resultant chilled hydrogen stream 39 emerges from the outlet of the liquid-vapor separator 36 preferably having purities at or below a product purity specification. The chilled hydrogen stream 39 is exported to the hydrogen pipeline 2 with valve 23 in the open position. The lowering of temperature and/or optional increase of pressure by the chiller unit 35 may increase absorption capacity of the brine such that more condensed contaminants are dissolved in solution with the brine before the brine becomes saturated.

Other modifications to the present invention are contemplated. For example, in an alternative embodiment, the stored hydrogen 4 is not chilled prior to introduction into the cavern 3. When all contaminants, such as carbon dioxide and hydrocarbons (e.g., methane), are dissolved within the brine, the stored hydrogen 4 is withdrawn as a crude hydrogen stream 21 and then specifically routed to the liquid-vapor separator 36 where the brine and contaminants therein are removed and separated from the crude hydrogen stream 21 in a manner as has been described. Alternatively, when the contaminants are dissolved in the brine to their saturation capacity, the additional release of contaminants from the salt cavern walls 203 infiltrates the interior cavity of the cavern 3 and remains in the vapor phase. The stored hydrogen 4 with saturated brine and gaseous contaminants are withdrawn as a crude hydrogen stream 21 that is redirected to the chiller unit 35 to cool and condense the contaminants which can then be subsequently removed with the saturated brine in the liquid-vapor separator 36. The lowering of temperature and/or optional increase of pressure by the chiller unit 35 may increase absorption capacity of the brine such that a substantial portion of the condensed contaminants become dissolved in solution with the brine. A portion of the condensed contaminants may be removed as a separate condensate stream from the saturated brine.

The present invention can be carried out to treat any concentration of contaminants within the crude hydrogen stream 21. Additionally, it should be understood that the various methods of the present invention for treating the crude hydrogen stream 21 are applicable for hydrogen streams withdrawn from other types of geological formations, such as, for example, lined hard rock caverns, depleted gas/oil reservoirs, aquifers and sedimentary basins.

It should be understood that various modifications to the present invention are contemplated without departing from the spirit and scope of the present invention. For example, a portion of the hydrogen product that is removed from a pipeline 2 may be sufficiently pressurized, thereby eliminating a need for its compression. Particularly, a portion of the hydrogen product that is removed from the hydrogen pipeline 2 can bypass the compressor 7, and thereafter be optionally cooled by chiller unit 35 and then introduced into the salt cavern 3. As the pressure in the cavern 3 increases and begins to deviate from predetermined compression requirements (e.g., pressure in the cavern 3 approaches or exceeds the pressure in the hydrogen pipeline 2), additional hydrogen product which is removed from the hydrogen pipeline 2 may require pressurization and can therefore be compressed by the compressor 7 prior to its introduction into the salt cavern 3. Additionally, it should be understood that stored hydrogen 4 can be withdrawn from the cavern 3 and re-routed to the compressor 7, if required to pressurize the withdrawn hydrogen to a sufficient pressure equal to or greater than the pressure of the pipeline 2. In this manner, the compressor 7 can be selectively utilized to introduce hydrogen product into the cavern 3 and withdraw stored hydrogen 4 from the cavern 3, as necessary during operation of the cavern 3. While the present invention has been described in relation to the ability to treat hydrogen at purity grades of preferably about 95% and higher, it should be understood that the principles of the present invention also are applicable to treatment of lower purity grades of hydrogen (i.e., below 95% purity) as well as other non-hydrogen containing gases, including inert gases, and any combination thereof.

The present invention can substantially reduce infiltration of contaminants from the salt cavern walls 203 of the salt cavern 3 when the stored hydrogen gas 4 has been chilled prior to introduction into the cavern 3, thereby mitigating concerns of contamination typically encountered when maintaining stored gas within conventional salt caverns. The ability to reduce contamination of the chilled and stored hydrogen gas 4 as shown in FIGS. 2B and 2C may in some instances eliminate the need for implementation of purification equipment upon withdrawal of the stored hydrogen gas 4 from the salt cavern 3. As a result, the present invention offers a process benefit of substantial reduction in cost and complexity of operating the salt cavern 3.

It should be understood that the present invention contemplates hydrogen product from various hydrogen sources. By way of example, hydrogen product may be removed from a hydrogen production source, such as one or more stream methane reformers, and thereafter introduced by a hydrogen pipeline into the salt cavern 3. In another example, the hydrogen product may be removed from a hydrogen recovery plant and directed by a hydrogen pipeline into the salt cavern 3. Alternatively, hydrogen product may be removed from any type of hydrogen storage source and routed by a hydrogen pipeline into the salt cavern 3. Still further, in addition to underground hydrogen storage caverns, it should be understood that the treatment methods as described in the present invention can offer process benefits in other applications. For example, the present invention may be utilized to treat a hydrogen stream having a purity level of 95% or higher with a moisture content of 1% or less in which the hydrogen stream is derived from various sources, such as, by way of example, an oil refinery. In this regard, a method for treating a hydrogen stream characterized by water vapor and one or more contaminants derived from a hydrogen source is contemplated in which hydrogen product is removed from the oil refinery. The hydrogen product is chilled to a temperature sufficient to condense at least a portion of the water vapor and at least a portion of the one or more contaminants. The condensed water vapor and the one or more of said contaminants can then be removed by a separation vessel, such as, for example, a knock-out drum.

While it has been shown and described what is considered to be certain embodiments of the invention, it will, of course, be understood that various modifications and changes in form or detail can readily be made without departing from the spirit and scope of the invention. For example, it should be understood that the present invention contemplates other means for chilling the compressed hydrogen stream 11. For example, the chiller unit may comprise a shell and tube exchanger, plate heat exchanger, fin heat exchanger or any other suitable heat exchanger that is commercially available. In addition, the present invention contemplates other means for removing the condensate. For example, a vapor-liquid separator drum may be used for removing the entrained condensate. The drum may be configured as a vertical vessel into which a liquid and vapor mixture (or a flashing liquid) is fed and wherein the condensate is separated by gravity, falls to the bottom of the vessel and is withdrawn. The vapor travels upward at a predetermined velocity, which is dependent at least on the type of condensate and size of condensate droplets. The predetermined velocity assists in minimizing entrainment of any liquid droplets in the vapor as the vapor exits the top of the vessel. The drum is preferably designed to minimize temperature increase as a result of hydrogen expansion within the drum by virtue of hydrogen's negative Joule Thompson coefficient.

It is, therefore, intended that this invention not be limited to the exact form and detail herein shown and described, nor to anything less than the whole of the invention herein disclosed and hereinafter claimed. The described embodiments herein are to be considered in all respects only as illustrative and not restrictive, and the scope of the invention is, therefore, indicated by the appended claims rather than by the foregoing description. All changes which come within the meaning and range of equivalency of the claims are to be embraced within their scope.

The invention claimed is:

1. A method for treating a moisture-containing hydrogen product to be stored in a salt cavern, comprising:
   removing hydrogen product from a hydrogen pipeline;
   compressing the hydrogen product to produce a compressed hydrogen product;
   cooling the compressed hydrogen product to condense at least a portion of water vapor prior to the compressed hydrogen product entering the salt cavern;
   removing the water vapor condensate to produce a compressed and chilled hydrogen product; and
   introducing the compressed and chilled hydrogen product into the salt cavern to produce chilled and stored hydrogen within the salt cavern.

2. The method of claim 1, further comprising the steps of:
   reducing a temperature of at least a localized portion of walls of the salt cavern by contacting at least a portion of the chilled and stored hydrogen with the localized portion of the walls so that one or more layers of the localized portion of the walls attains a stabilized state whereby contaminant release from said walls is suppressed.

3. The method of claim 1, wherein the chilled and stored hydrogen is—dry to have capacity to absorb water vapor contained in the cavern to a level at or below a product purity specification.

4. The method of claim 3, further comprising:
   withdrawing said chilled and stored hydrogen from the salt cavern to produce a supply of hydrogen; and
   introducing the supply of hydrogen into the pipeline.

5. The method of claim 4, wherein the introducing of the supply of hydrogen into the pipeline is characterized by an absence of drying of the supply of hydrogen.

6. The method of claim 5, further comprising sampling concentration levels of one or more contaminants in the supply of hydrogen, said contaminants selected group from the group consisting of hydrocarbons, water vapor, sulfur compounds and carbon dioxide.

7. The method of claim 3, further comprising:
withdrawing said stored hydrogen from the salt cavern to produce a supply of hydrogen product;
chilling the supply of hydrogen to remove a sufficient amount of water vapor having an impurity level of water vapor at or below a product purity specification; and
introducing the hydrogen product into the hydrogen pipeline.

8. The method of claim 1, wherein the compressed and chilled hydrogen to be introduced into the salt cavern is characterized by an impurity level of water vapor at or below a product purity specification.

9. The method of claim 1, further comprising:
contacting at least a portion of the chilled and stored hydrogen with walls of the salt cavern; and
reducing a temperature of the walls to a temperature sufficient to lower the rate of infiltration of a substantial portion of contaminants contained therein, wherein said contaminants is selected from the group consisting of water vapor, carbon dioxide, hydrocarbons, sulfur-containing compounds and any combination thereof.

10. A system for storing hydrogen product in a salt cavern, comprising:
a compressor configured to pressurize hydrogen product within the salt cavern to form stored hydrogen;
an aftercooler situated downstream of the compressor, said aftercooler configured to remove a heat of compression from the pressurized hydrogen product;
a chiller configured to impart additional cooling beyond the heat of compression to condense at least water vapor from the hydrogen product, said chiller in fluid communication with the compressor;
a liquid-vapor separator vessel configured collect and accumulate at least the removed water vapor condensate, said collection vessel located downstream and in fluid communication with the chiller;
a flow network positioned between the salt cavern and the compressor, the chiller and the collection vessel, said flow network comprising a first leg and a second leg;
the first leg in flow communication with the salt cavern to introduce product hydrogen into the salt cavern to form stored hydrogen that is chilled to a temperature sufficient to remove a portion of water vapor to produce a chilled and stored hydrogen product; and
the second leg in flow communication with a hydrogen pipeline and the first leg to withdraw the stored and chilled hydrogen from the salt cavern.

11. The system of claim 10, further comprising:
a third leg in flow communication with the salt cavern and the chiller to re-chill and/or separate condensate from the stored and chilled hydrogen to produce a supply of hydrogen; and
a fourth leg in flow communication with the first leg and the second leg to return the supply of hydrogen to the hydrogen pipeline.

12. The system of claim 10, further comprising a temperature detection means for monitoring a temperature of the cavern.

13. The system of claim 10, further comprising an analyzer bank for measuring at least water vapor, said analyzer positioned along the second leg.

14. The system of claim 10, wherein said system is characterized by the absence of purification equipment.

15. A method for supplying hydrogen to a hydrogen pipeline from an underground hydrogen storage cavern, comprising:
removing hydrogen product from a hydrogen pipeline;
compressing the hydrogen product to produce a compressed hydrogen product;
cooling the compressed hydrogen product to remove heat of compression from the compressed hydrogen product;
imparting additional cooling of the compressed hydrogen product to condense at least a portion of water vapor to create water vapor condensate prior to the compressed hydrogen product entering the salt cavern;
removing the water vapor condensate to produce a compressed and chilled hydrogen product; followed by
introducing the compressed and chilled hydrogen product into the salt cavern to produce chilled and stored hydrogen within the salt cavern;
withdrawing a crude hydrogen stream from a salt cavern, the crude hydrogen stream comprising one or more contaminants imparted by the salt cavern;
separating at least a portion of the one or more contaminants to form a condensate from the crude hydrogen stream to produce a hydrogen product; and
introducing the hydrogen product into the hydrogen pipeline to supply additional hydrogen to the pipeline.

16. The method of claim 15, further comprising cooling the crude hydrogen stream to a temperature less than about 200 deg F. but above the liquefaction temperature of the crude hydrogen stream.

17. The method of claim 15, wherein said crude hydrogen stream is derived from a compressed hydrogen product stream that is cooled prior to introduction in the underground hydrogen storage cavern.

18. The method of claim 15, wherein said contaminants is selected from the group consisting of water vapor, carbon dioxide, hydrocarbons, sulfur compounds and any combination thereof.

19. The method of claim 15, further comprising introducing the hydrogen product into the hydrogen pipeline, wherein said hydrogen product comprises contaminants each of which has an impurity level at or below a product purity specification.

20. A method for operating an underground salt cavern, comprising the steps of:
detecting one or more contaminants in a crude hydrogen stream withdrawn from the cavern to exceed a product purity specification; and in response thereto
increasing cooling of a compressed hydrogen stream that is removed as hydrogen product from a hydrogen pipeline; and
increasing cooling of the crude hydrogen stream that is withdrawn from the cavern;
wherein the cooling of the compressed hydrogen stream and the cooling of the crude hydrogen stream enables a lowering and maintaining of the one or more contaminant at or below a product purity specification.

21. A method for treating a hydrogen product to be stored in a salt cavern, comprising:
removing hydrogen product from a hydrogen pipeline;
compressing the hydrogen product to produce a compressed hydrogen product;
removing at least a first portion of water vapor from the compressed hydrogen product; and introducing the compressed hydrogen product into the salt cavern to produce stored hydrogen.

22. The method of claim 21, further comprising:
withdrawing at least a portion of the stored hydrogen from the salt cavern as a crude hydrogen stream;
removing at least a second portion of water vapor from the crude hydrogen stream to produce a gaseous hydrogen product; and
supplying the gaseous hydrogen product to the hydrogen pipeline.

23. The method of claim 21, further comprising:
withdrawing at least a portion of the stored hydrogen from the salt cavern as a crude hydrogen stream;
removing one or more contaminants within the crude hydrogen stream to produce a gaseous hydrogen product; and
supplying the gaseous hydrogen product to the hydrogen pipeline.

* * * * *